H. ROICK.
BAND SAW GUIDE.
APPLICATION FILED NOV. 22, 1912.
1,069,032.
Patented July 29, 1913.
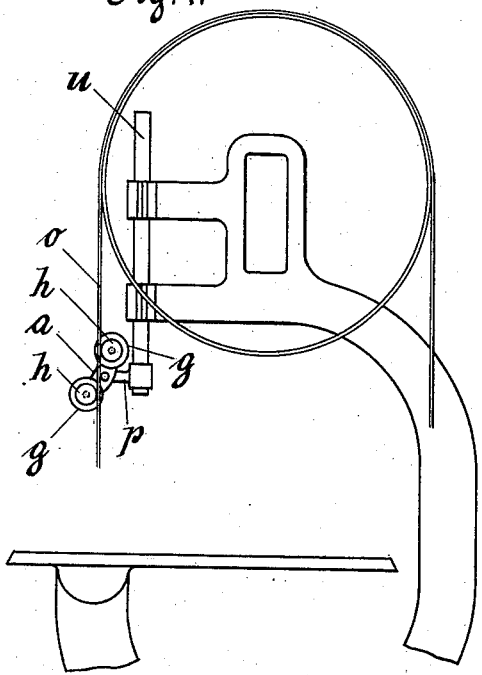
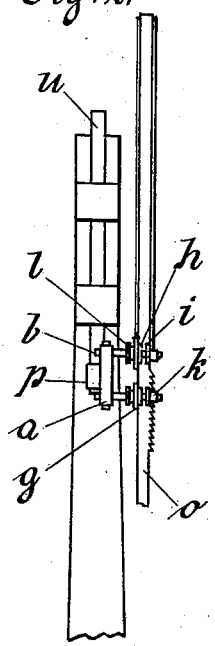
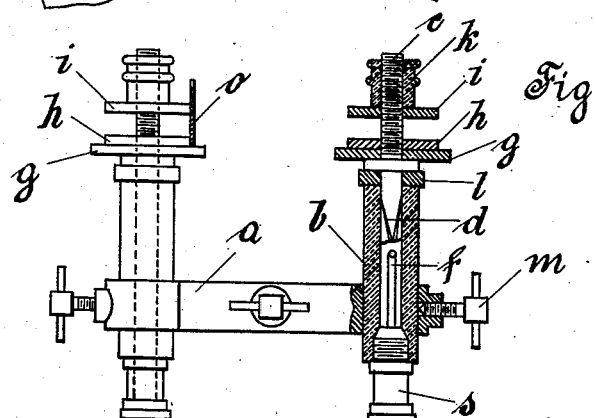
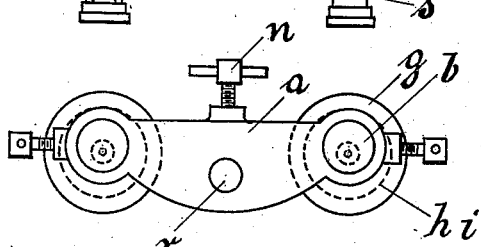
Witnesses:
K. Gnelakowski
Karl Berg.
Inventor:
Hubert Roick

UNITED STATES PATENT OFFICE.

HUBERT ROICK, OF ALTDAMM, GERMANY.

BAND-SAW GUIDE.

1,069,032.  Specification of Letters Patent.  Patented July 29, 1913.

Application filed November 22, 1912. Serial No. 732,968.

*To all whom it may concern:*

Be it known that I, HUBERT ROICK, subject of the King of Prussia, residing at No. 75 Stargarderstrasse, Altdamm, in the Kingdom of Prussia, Germany, have invented new and useful Improvements in Band-Saw Guides, of which the following is a specification.

My invention relates to an improved band-saw-guide destined to be attached to band-sawing machines for accurately guiding the band-saw while working. Saw-guides constructed for the same purpose have been known and used before, and among those there are some, in which the rear edge of the saw is made to bear against the circumference of cylindrical rolls. Owing to the great speed of the traveling saw-blade, its rear edge used to cut grooves into the circumference of the rolls, and such grooves used to impair the true cutting plane of the front or cutting edge of the saw. The result of such even slight deviations from the true plane of the cutting blade is a rough surface of the cut obtained into the wood or other material and the surfaces had to be subsequently smoothed by planing or other tools, while, with the use of a perfect saw-guide the surfaces obtained by the cutting saw require scarcely any subsequent finishing work. It has also been tried before to construct band-saw-guides having two or more guide-rolls or pairs of guide-rolls, which, however, have been found objectionable for the reason that the saw-blade was too tightly engaged between the said rolls, which acted as a brake, and if a brazed portion of the saw came to pass between the rolls, the saw-blade used to break and the driving belt to come off the driving pulley. With the use of such known constructions of band-saw-guides it has, further, been impossible up to this, to cut deeper than about ten inches, while, on trying to cut deeper, the saw-guide entirely failed to succeed.

The purpose of my invention is to overcome such difficulties hitherto experienced.

The improvements of my construction consist in establishing in a single apparatus a double roll-guide, consisting of two or more pairs of guide-rolls which have a bearing or guiding contact both against the side surfaces as also against the rear edge of the saw-blade. The saw-blade is engaged between the guide rolls on both sides, the portions engaged between the rolls being located in close proximity to each other. By this means the brazed portions of the blade or any other portions which happen to exceed the normal thickness of the blade, may freely pass between the rolls without subjecting the blade to an increased strain; the liability to breaking is almost entirely removed from the saw and a further particular advantage is obtained in that the saw will cut as deep as may be desired. On adjusting the rolls of the apparatus up to the saw-blade before working is started, it will never occur that the rolls engage the blade too tightly because even the slightest contact of one pair of guide rollers against the saw-blade will cause the other pair of guide-rolls to be applied to the blade with an equal degree of tension.

By the use of a band-saw-guide constructed according to this invention the cut obtained by the band-saw will be so straight and smooth that, on operating upon dry and hard blocks of wood, any further planing of the surfaces may be omitted, the surfaces of the wood being ready for grinding immediately after leaving the sawing machine. The depth of the cut, besides, may be continued up to 20 inches and even more.

To make my invention perfectly understood, I have illustrated the same in the accompanying drawings, in which:

Figure 1 is a side-elevation of a portion of a band-saw-machine with the improved band-saw-guide in place. Fig. 2 is an end-view of the same, seen from the left to the right of Fig. 1. Fig. 3 is a view, partly in section, of the saw-guide apparatus separated from the sawing machine and drawn to a larger scale, and Fig. 4 is a plan, seen from the lower side of Fig. 3.

The guide-apparatus as represented in the drawings is of the type having two pairs of guide-rollers, which I prefer though the number of roller-pairs may be increased. The said apparatus, as fully illustrated in Figs. 3 and 4 comprises a cross-bar or stay *a*, having at or near both of its ends apertures for receiving cylindrical bushings *b*, adapted to slide within the said cylindrical apertures and to be fixed in the desired position by the aid of set-screws *m*. Each of said bushes *b*, has an eccentric bore for receiving a pin *c*, which carries the guide rolls at its front or forward portion, the rear portion within the bush *b*, being provided with a hole $f$, and grooves $d$ for lubricating material. Each of said pins $c$ has mounted to its forward end, outside the bush $b$, three guide-rollers $g$, $h$, and $i$, the said rollers $g$, and $h$, being screwed to the said pin $c$, while the roll $i$ is adjustable in the longitudinal direction of the pin $c$. A disk $l$, of hard wood or equivalent material may be conveniently interposed between the roll $g$, and the bushing $b$, to prevent wear and tear of said bush during the continued though slow rotation of the rolls. A nut $k$ screwed to the upper threaded portion of the pin $c$, serves to adjust and limit the position of the roll $i$. Lubricating material for greasing the rotating pin $c$, is introduced through the lubricators $s$ at the foot-end of the bushes $b$.

The saw-guide-apparatus is fitted to the band-saw-machine as shown in Figs. 1 and 2, by fitting the hole $r$ of the cross-bar or stay $a$, on to a pin projecting from a bracket or arm $p$ mounted to the lower end of a carrier $u$, of the machine frame. The stay $a$, may be turned on its carrying pin and adjusted in position by a set-screw $n$, entering into the side of said stay $a$. The adjustment of the apparatus is so made, that the cross-stay $a$ will take an oblique position with relation to the path of the saw-blade, thus placing the pairs of rolls on the two pins $c$ against either side-surface of the saw, the circumference of the rolls $h$ bearing against the opposite side surfaces of the saw, the points of contact being apart from each other but in close proximity, and the rear edge of the saw-blade having a bearing support against the roll-surface $g$, as clearly shown in Figs. 1, 2, and 3 of the drawings. The bushes $b$, being eccentrically mounted on the pins $c$, a slight turn given to said bushes will suffice to more or less approach to or remove from the blade $o$, the guide-rolls carried by said pins $c$. The adjustability of the said bushes in the longitudinal direction, as before described, will enable the operator to adjust the rolls $g$ into contact with the rear edge of the saw-blade $o$.

With saw-blades of little width it would be found sufficient to employ only the two pairs of rolls $g$, and $h$, and the saw would be accurately guided nevertheless. But with saw-blades of superior width, the rolls $g$, and $h$, would guide the saw only at its rear portion, leaving the front portion unguided and liable to swerving from the true cutting plane. To prevent this, the third pair of rollers $i$, has been provided, and the adjustability of the said roller $i$ toward and from the rollers $g$, $h$, provides great facility for guiding saw-blades of any desired width, the said roller $i$ being applied to the side of the saw-blade near the toothed front portion of the blade, thus guiding the blade minutely in all its parts. The height of the several guide-rolls $g$, $h$, $i$, might of course be increased or reduced according to the circumstances and dimensions of the saw.

With the use of a saw-guide constructed according to this invention, the saw will be positively prevented from coming out of its true plane of cutting and the cut obtained will be so smooth as to obviate all further finishing work. Also the sawing machine, owing to the smooth and facilitated cut, will go as easily as may be desired.

I claim as my invention:

1. A band-saw-guide comprising a cross-bar, means for pivotally and adjustably securing the same to the frame of the sawing machine at an inclined position with relation to the plane of the band-saw-blade, bushes carried in said cross-bar adapted to adjustably slide in the longitudinal direction, a rotatable pin eccentrically extending into each of said bushes and guide-rolls carried by said pin, the distance between the two bushes and pins being so calculated as to allow passing of the saw-blade between the pairs of guide-rolls in a plane inclined to a line connecting the axis-lines of the roll-carrying pins, substantially as and for the purpose set forth.

2. In a band-saw-guide, the combination, with a supporting stay, of means to pivotally and adjustably secure said stay to the frame of the sawing machine, bushes carried in bearings of said stay and adapted to adjustably slide in said bearings in the longitudinal direction, a rotatable pin eccentrically extending into each of said bushes, a plurality of guide-rolls carried by each of said pins, each roll co-acting with a corresponding roll on the opposite pin, a nut carried by a threaded portion of each pin for adjusting the position of one of said guide-rolls, the said bushes and pins being so located with relation to each other and to the supporting stay, that the saw blade may pass between the guide-rolls in a plane crossing the supporting stay at acute angles, substantially as and for the purpose set forth.

In testimony whereof I have signed my name to this specification in the presence of two subscribing witnesses.

HUBERT ROICK.

Witnesses:
K. GOZELACHOWSKI,
KARL BERG.